United States Patent [19]

Obergfell

[11] 4,231,604
[45] Nov. 4, 1980

[54] SHOVEL HAVING FULCRUM DEVICE

[76] Inventor: James J. Obergfell, 4407 Weisser Park, Fort Wayne, Ind. 46806

[21] Appl. No.: 47,728

[22] Filed: Jun. 12, 1979

[51] Int. Cl.³ .............................................. A01B 1/02
[52] U.S. Cl. ........................................ 294/59; 294/58
[58] Field of Search ................... 294/59, 58, 57, 44; 16/110 R, 114 R, 108, 109; 37/53; 172/371; 15/147 D; 81/52.3

[56] References Cited

U.S. PATENT DOCUMENTS 3,981,043  9/1976  Curry ..................................... 294/57

FOREIGN PATENT DOCUMENTS 1009947  11/1965  United Kingdom ..................... 284/58

Primary Examiner—James B. Marbert
Attorney, Agent, or Firm—Gust, Irish, Jeffers & Hoffman

[57] ABSTRACT

A shovel having a blade and an elongated handle is provided between the ends thereof with a laterally extending enlargement. A resilient pad and cover are placed over and supported by the enlargement and handle. The supported pad acts as a fulcrum when placed on the user's thigh just above the knee. The loaded blade may then be raised by lowering the free handle end with one hand and when the blade is in a sufficiently raised position, the handle may be grasped with the other hand near the blade for carrying or discharging the load from the blade.

3 Claims, 4 Drawing Figures

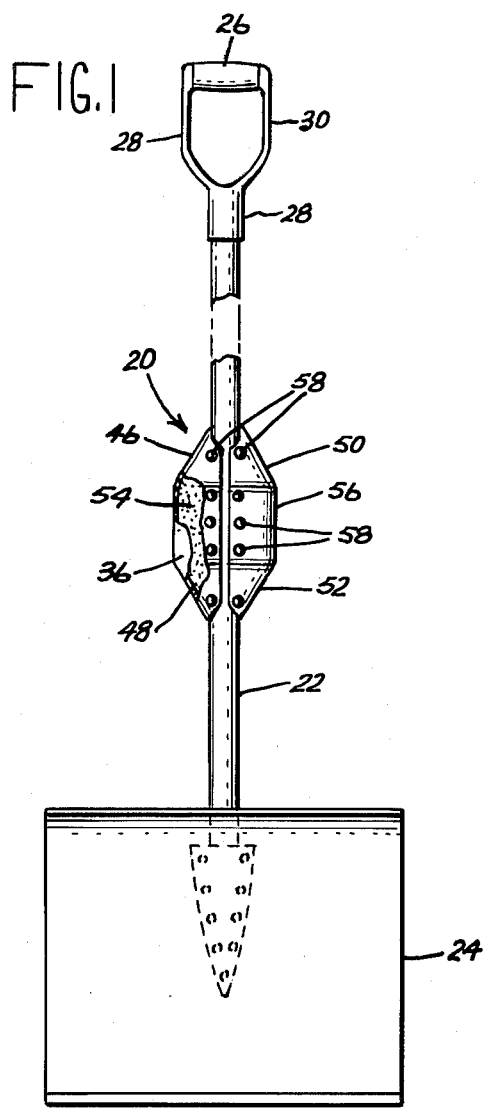
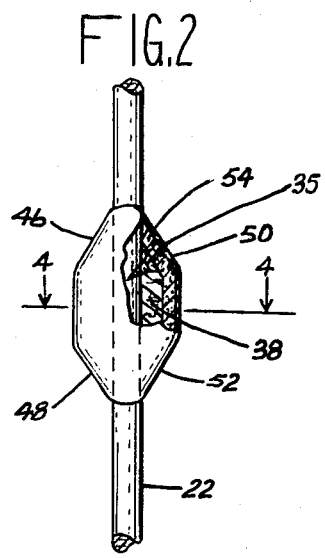
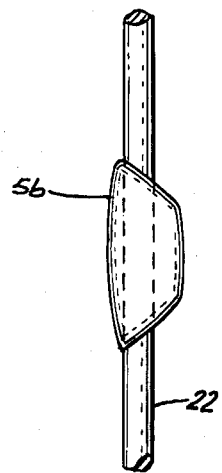
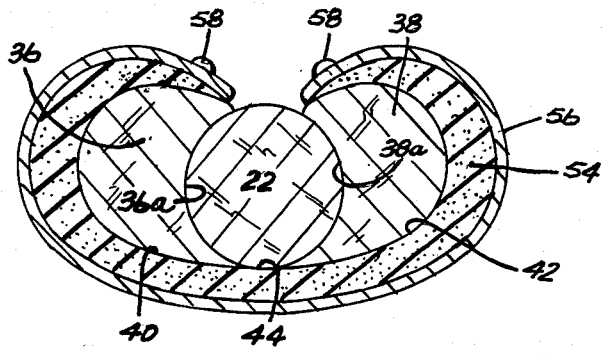

SHOVEL HAVING FULCRUM DEVICE

BACKGROUND OF THE INVENTION

1. Field of the Invention

This invention is in the field of lifting implements, such as shovels, for manual use.

2. Description of the Prior Art

Shovels, and other lifting implements, adapted for manual use are commonly used for shoveling relatively heavy loads such as wet snow, dirt, gravel and the like. In the usual manner of shovel use, the shovel blade is placed under or inserted in the load to be lifted and the user grasps the handle end with one hand and the handle area adjacent the shovel blade with the other hand and then lifts the loaded shovel with leg, arm and/or back muscles. While proper shovel use is such that the leg muscles do the primary lifting, all too often, especially after a considerable shoveling period, the user relies primarily on his back muscles for lifting. This frequently results in painful, and sometimes serious, back injury. Further, even when the leg muscles are properly used in the lifting of the load, the strain on the user's cardio-vascular system proves harmful. This is especially so when the user undertakes heavy shoveling sporadically, such as snow shoveling. Various attempts have been made over the years to ease the shoveling burden and are exemplified by the following patents: U.S. Pat. Nos. 635,591; 781,772; 930,660; 1,693,472; 2,560,856; 3,078,604 and 3,751,094.

However, none of the devices disclosed in the above patents satisfactorily alleviate the above noted problems.

SUMMARY OF THE INVENTION

A shovel has an elongated handle having a load blade affixed to one end thereof. A pair of enlargements are affixed to the opposite sides of an intermediate point of the handle and extend laterally therefrom. The lower surfaces of the enlargements are substantially flush with the handle surface and in cross-section are convex. A resilient pad is attached to the convex lower surface and is covered with a leather, plastic, or other durable material. The cover material is selected to resist slipping relative the user's leg during the lifting movement.

The supported pad and cover provide a fulcrum to be placed on the user's thigh above the knee after the shovel blade has been loaded. The load may then be lifted by a downward movement, imparted by one of the user's hands, to the handle end and after the load has been lifted to a desired height, the user grasps the shovel handle adjacent to the blade for transporting or discharging the load from the blade.

The placement of the supported, resilient pad and cover on the shovel handle is selected to provide a desired mechanical advantage in lifting the loaded blade as well as convenience and placement on the user's leg area just above the knee.

Due to the width and convexity of the fulcrum surface, the fulcrum load is comfortably distributed on the user's leg, and the shovel is stabilized against rotative movement of the shovel about the handle axis.

In operation of a shovel of this invention, the exertion required and muscle stress are minimized. Also, the fulcrum is sufficiently compact so that it does not impair use of the shovel in the conventional manner. The fulcrum is relatively inexpensive in manufacture and sturdy and durable in use.

It is therefore an object of this invention to provide a shovel for manual use that minimizes physical exertion and muscle stress in the lifting of a loaded shovel blade, and is inexpensive in manufacture and durable in use.

It is an object of this invention to provide a shovel having a padded fulcrum area that is laterally dimensioned and configured to distribute the fulcrum load comfortably on the user's leg.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a front elevational view, partially broken away, of a shovel embodiment of this invention;

FIG. 2 is a partial rear elevational view, partially broken away, of the embodiment of FIG. 1;

FIG. 3 is a partial side elevational view of the embodiment of FIG. 2 taken from the direction of arrow 3; and FIG. 4 is an enlarged sectional view taken at section line 4—4 of FIG. 2.

DESCRIPTION OF THE PREFERRED EMBODIMENT

Referring to the drawing, a shovel 20 has an elongated wooden handle 22 having affixed at one end thereof in conventional manner a blade 24, typically adapted for shovelling show. The other end of handle 22 has affixed thereto a hand grip 26 supported by bifurcated arms 28, 30 with a socket 28 for placement over and attachment to, as by bolting, the handle end.

Attached at an intermediate section of handle 22 as by adhesive and wood screws 35, are a pair of enlargements 36, 38 having surfaces 40, 42, respectively, substantially flush with the handle surface 44 to provide a fulcrum area on the underside of the handle, which is convexly shaped both transversely and longitudinally of the handle 22. Enlargements 36, 38 may be of wooden block construction. The inside surfaces 36a, 38a of enlargements 36, 38, respectively, are concavely configured to fit snugly on handle 22 surfaces. Enlargements 36, 38 are smoothly rounded on their outer surfaces with surface portions blending smoothly with surface portion 44 of handle 22. Enlargement 36 is tapered at ends 46, 48, and enlargement 38 is likewise tapered at ends 50, 52. Thus configured, the enlargements provide minimum interference with use of the shovel. A resilient foam rubber pad 54 is configured to the enlargements 36, 38 and handle 44 by being wrapped substantially therearound and affixed thereto as by adhesive. Pad 54 may be of a relatively firm foam rubber or other resilient material. A cover 56 is fitted snugly and tightly about pad 54 and configured to the contours thereof, being affixed thereto by adhesive. The material of cover 56 may be leather or plastic and is selected to be long wearing and to provide a slip resistant surface in use of the handle to be later described. Nails or screws 58 are driven along the edges of cover 56, pad 54 and wings 36, 38 to maintain pad 54 and cover 56 in a tight wrap around enlargements 36, 38. The supported pad 54 and cover 56 thus provide, in use, a fulcrum member.

In use of the embodiment shown, the user grasps grip 26 with one hand and handle 22 adjacent blade 24 with the other hand and forcibly slides blade 24 under the load, after which the underside of the supported pad 54 and cover 56 is placed on the user's thigh just above the knee. The load may then be lifted with a downward movement on grip 26, exerting a downward force on the user's thigh at a fulcrum area, until the loaded blade 24 is at a desired height. The user may then transport the load or discharge it from the blade 24 in conventional fashion. It is noted that the lifting of the load is done with a downward arm movement using the mechanical advantage related to the lengths of handle 22 above and below the fulcrum area. The primary force in the shovel lift is a downward force on the user's leg at the fulcrum area. The mechanical advantage may be altered by varying the handle lengths as desired.

Also, due to the lateral width of the fulcrum pad assembly, and the resiliency of pad 54, the fulcrum load is comfortably distributed on the fulcrum area for repeated lifting movements of the shovel. The lateral width of the fulcrum area also provides shovel stability against rotation about the handle axis during the lifting movement which is especially important where a wide shovel blade is used as in snow shoveling. Further, the shovel may be used in the conventional manner with minimal interference from the fulcrum pad structure since it is relatively small and is not cumbersome. The fulcrum shovel is relatively economical to manufacture and is sturdy and durable in use.

While there have been described above the principles of this invention in connection with specific apparatus, it is to be clearly understood that this description is made only by way of example and not as a limitation to the scope of the invention.

What is claimed is:

1. A lifting implement comprising an elongated handle having a load-carrying blade on one end,
    a fulcrum device affixed to said handle intermediate the ends thereof in such position to impart a lifting movement to said blade when said device is engaged with the user's thigh and the other end of said handle is moved downwardly, said device being wider than said handle to stabilize said handle against rotation about its axis, said device including a supporting enlargement having a resilient pad on the thigh-engaging portion thereof, said thigh-engaging portion being convexly curved in directions both longitudinally and laterally of said handle, said supporting enlargement having an inner concave surface which fits snugly against said handle surface and a rounded outer surface that extends laterally beyond each side of the thigh-engaging surface of said handle, said enlargement further having predetermined lateral and longitudinal dimensions to distribute the fulcrum force over the area of the user's thigh, said pad being mounted on said rounded outer surface of said enlargement.

2. The apparatus of claim 1 wherein said fulcrum device comprises a cover configured to and snugly fitted over said pad;

3. A lifting implement comprising an elongated handle and a load blade affixed at one end thereof;
    a fulcrum member being affixed to said handle intermediate the ends thereof;
    said member being positioned longitudinally of said handle to impart a lifting movement to said blade by placing said member on the user's thigh area adjacent the knee and exerting a downward movement of the other handle end;
    the handle lengths on either side of said fulcrum member being proportioned to provide predetermined leverage in lifting and moving said blade;
    said member being laterally wider than said handle to distribute the fulcrum load over the thigh area and stabilize the handle against rotation about the handle axis, the ends of said member being tapered towards said handle to facilitate interference free movement and use of the implement.

* * * * *